(12) United States Patent
Brantley

(10) Patent No.: US 6,928,797 B1
(45) Date of Patent: Aug. 16, 2005

(54) HARVESTER ACCUMULATOR AND BASKET STRUCTURE

(75) Inventor: Jason Paige Harris Brantley, Johnston, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/777,526

(22) Filed: Feb. 12, 2004

(51) Int. Cl.$^7$ .............................................. A01D 46/08
(52) U.S. Cl. ........................... 56/12.9; 56/30; 460/115
(58) Field of Search .............................. 56/12.9, 13.3, 56/13.1, 28, 30, 31, 341, DIG. 8; 460/119, 460/115

(56) References Cited

U.S. PATENT DOCUMENTS

| | | | | |
|---|---|---|---|---|
| 4,452,134 A | * | 6/1984 | Muse | 100/90 |
| 4,534,285 A | | 8/1985 | Underhill | 100/88 |
| 4,548,131 A | | 10/1985 | Williams | 100/1 |
| 4,553,378 A | | 11/1985 | Fachini et al. | 56/16.6 |
| 4,606,177 A | | 8/1986 | Schlueter | 56/30 |
| 4,930,297 A | | 6/1990 | Schlueter et al. | 56/16.6 |
| 4,996,831 A | | 3/1991 | Pearson et al. | 56/16.6 |
| 5,556,338 A | | 9/1996 | Covington | 460/119 |
| 5,616,077 A | | 4/1997 | Covington et al. | 460/119 |
| 5,857,908 A | | 1/1999 | Snyder et al. | 460/115 |
| 6,032,446 A | | 3/2000 | Gola et al. | 56/341 |
| 6,159,094 A | * | 12/2000 | Deutsch | 460/98 |
| 6,263,650 B1 | | 7/2001 | Deutsch et al. | 56/16.4 |
| 6,321,516 B1 | | 11/2001 | Wigdahl et al. | 56/30 |
| 6,421,992 B1 | | 7/2002 | Goering et al. | 56/28 |
| 6,421,996 B1 | | 7/2002 | Deutsch et al. | 56/341 |
| 6,591,743 B2 | | 7/2003 | Deutsch et al. | 100/8 |

* cited by examiner

Primary Examiner—Meredith Petravick

(57) ABSTRACT

A harvester having a receptacle movable between a harvest position for receiving crop and a dump position for unloading the crop includes an air duct system with a first duct extending upwardly towards the inlet of an accumulator located adjacent the receptacle. An air system propels the removed crop upwardly through the air duct towards the inlet. A second upright duct located adjacent a lower accumulator outlet directs crop from the accumulator to the receptacle. When the receptacle is raised to the dump position, all the crop is directed into the accumulator and the outlet is blocked so that the harvester can continue to operate while the receptacle is unloaded. Diverter structure may be provided for facilitating movement of the removed crop directly into the receptacle when the receptacle is in the harvest position and directing the removed crop downwardly into the accumulator when the basket is moved towards the dump position.

17 Claims, 1 Drawing Sheet

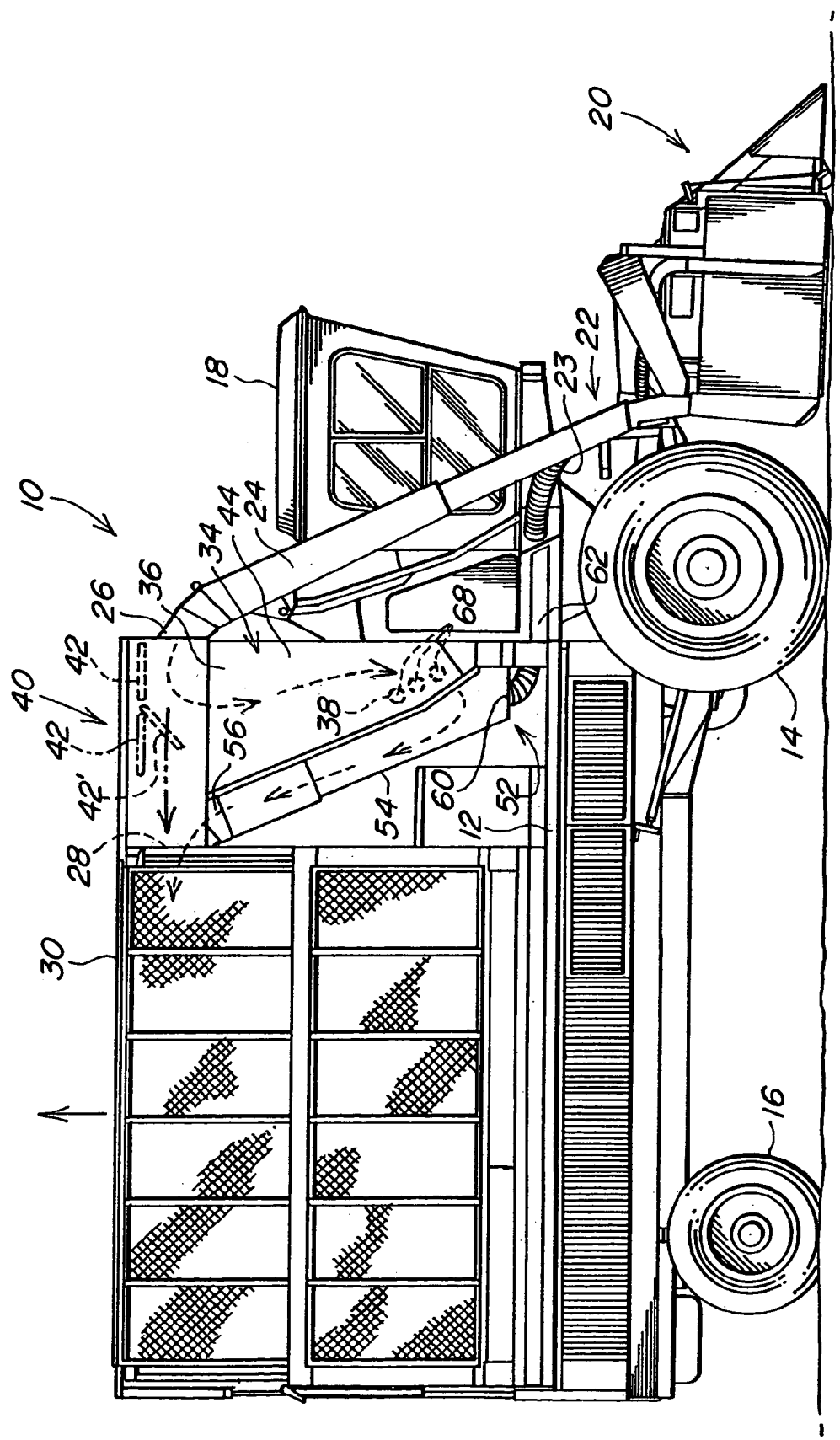

HARVESTER ACCUMULATOR AND BASKET STRUCTURE

FIELD OF THE INVENTION

The present invention relates generally to agricultural harvesters and, more specifically, to a harvester basket and accumulator system useful with implements such as cotton harvesters.

BACKGROUND OF THE INVENTION

Harvesters such as cotton pickers and cotton strippers include upright cotton conveying ducts directing cotton from the harvesting structure upwardly and rearwardly into a telescoping basket or receptacle. One problem with such a fixed arrangement is lost productivity resulting from the need to stop the harvester to dump the cotton into a boll buggy, module builder or cotton trailer. Typically the basket must be raised for unloading, and the flow of cotton from the air system has to be stopped to avoid crop loss. Although accumulator systems such as shown in commonly assigned U.S. Pat. No. 6,263,650 have been built for use with on-board processors such as module builders or bailers to avoid interruptions in harvesting during unloading, the problem of lost productivity during basket unloading in off-machine processing systems still persists. Since off-machine processing and the infrastructure associated with such processing continues to dominate the cotton industry, an improved system is necessary to reduce or eliminate harvester down time during basket unloading.

SUMMARY OF THE INVENTION

It is therefore an object of the present invention to provide an improved on-board storage system for a harvester. It is a further object to provide such a system which facilitates continued harvester operation during storage unloading. It is yet another object to provide such a system which overcomes the aforementioned problems.

It is a further object to provide an improved storage system for a harvester having a basket movable to unloading condition for transferring crop such as cotton to an off-harvester receiver such as a trailer, boll buggy or module builder. It is another object to provide such a system which increases productivity of the harvester by facilitating unloading while the harvester continues to operate in the field. It is another object to provide such a system which is particularly useful with currently available infrastructure employed to remove cotton from the harvester.

An accumulator is mounted between crop removing structure and the storage basket on a harvester such as a cotton picker or stripper. The accumulator permits crop material to continuously pass from a conveying duct through to the basket until the basket is ready for unloading. Upon activation of a switch or sensor, for example, during unloading of the basket, crop flow to the basket is interrupted. During interruption of flow to the basket, cotton is stored in the accumulator. When the basket is ready to receive harvested crop again, the cotton stored in the accumulator during unloading of the basket is metered into a second duct that conveys the cotton to the basket. A system of rollers selectively meters cotton from the accumulator to the second duct. When turning, the rollers allow cotton to pass, and when stopped, the rollers prevent egress of cotton. A diverter may be utilized at the top of the accumulator to selectively allow cotton to move directly into the basket or to deflect the downwardly into the accumulator.

The accumulator facilitates continued harvesting while the basket is unloaded. When the operator initiates the dump cycle, the metering rolls stop turning. If the diverter is employed, material flow to the basket is automatically stopped, and the crop is directed downwardly into the accumulator. As the basket is dumped, removed crop is collected in the accumulator.

The accumulator for a cotton harvester holds enough cotton to allow the basket to unload while the harvester continues to operate in the field. The metering rolls and second duct are sized to generally match the capacity of the other harvester systems and move cotton quickly enough to empty the accumulator before the next dump cycle. The system provides greatly improved cotton harvester productivity and does not require changes in the current infrastructure employed to remove cotton from the harvester.

These and other objects, features and advantages of the present invention will become apparent to one skilled in the art upon reading the following detailed description in view of the drawings.

BRIEF DESCRIPTION OF THE DRAWINGS

The single drawing FIGURE is a side view of a cotton harvester including accumulator and basket structure facilitating basket unloading while the harvester continues to operate in the field.

DESCRIPTION OF THE PREFERRED EMBODIMENT

Referring now to FIG. 1 therein is shown a cotton harvester 10 having a main frame 12 supported for movement by forward drive wheels 14 and rear steerable wheels 16. An operator station or cab 18 is supported at the front end of the main frame 12 above forwardly mounted harvesting structure indicated generally at 20 which removes cotton from plants and directs the removed cotton into a harvester air duct system 22 including air jet nozzle structure 23 and upright telescoping duct structure 24 extending from the harvesting structure 20 to a duct outlet 26 opening rearwardly toward a forwardly opening upper inlet area 28 of a basket or receptacle 30.

An upright accumulator system 34 with an upper inlet 36 and a metering floor or gate 38 is supported on the frame 12 behind the cab 18 for receiving the cotton from the first air duct 22. The accumulator system 34 is supported forwardly adjacent the harvester basket 30 with the inlet 36 opening upwardly into a transition area between and below the basket inlet area 28 and the duct outlet 26. The accumulator structure may be generally of the type of construction shown and described in commonly assigned U.S. Pat. No. 6,236,650 with the exception of the conveying structure area adjacent the metering floor 38.

A hood and diverter grate system 40 is supported in the transition area and includes finger grates 42 which allow some of the trash and debris blown from the duct outlet 26 to exit the stream of cotton flowing from the duct structure while maintaining a flow path of the cotton below the grates. The finger grates 42 are movable between a horizontal position for allowing cotton to flow directly into the inlet area 28 of the basket 30, as shown at 42, and a downwardly directed diverting position 42' for intercepting the flow of material from the duct outlet 26 and directing substantially all the material downwardly through the inlet area 36 into an accumulator chamber indicated generally at 44. The diverter grate system 40 may be generally of the type of construction shown and described in commonly assigned U.S. Pat. No. 4,606,177.

A second air duct system 52 includes an upright duct 54 having a lower end opening into the metering floor 38 and an upper end 56 opening upwardly and rearwardly into the transition area towards the upper inlet area 28 of the basket 30. Air jet nozzle structure 60 directs air from cotton harvester air system 62, which also supplies air to the jet nozzle structure 23, upwardly into the duct 54 to draw cotton delivered from the metering floor 38 into the duct and to propel the cotton through the duct 54 and out the end 56 towards the basket inlet area 28.

The metering floor 38 may be any suitable structure for selectively opening and closing the lower end of the chamber 44 to the duct 54 and, as shown, includes a plurality of rollers 68 which, when rotated, meter the harvested material from the chamber 44 into the lower end of the duct 54. When the rollers 68 are stationary, they act to block egress of the material from the chamber.

In operation, cotton is removed from cotton plants by the units 20 and directed upwardly by the air duct system 22 to the outlet 26. The harvested material is propelled rearwardly over the accumulator inlet 36. With the finger grates 42 in the generally horizontal position, the harvested material is free to flow rearwardly through the hood and diverter grate system 40 directly into the basket 30. When the operator desires to unload the basket 30, the hydraulic system on the harvester is operated to initiate transition of the basket into an unloading mode. The unloading mode may include a raising or tilting of the basket 30 (arrow in the drawing figure), a lowering of a wall or conveyor, a lowering of a portion of a wall, or any other suitable means for efficiently moving harvested material from the basket 30. In the unloading mode, the basket inlet 28 may no longer align with the duct outlet 26, or the operator may desire for other reasons to interrupt flow to the basket while continuing to harvest.

To temporarily halt cotton flow from the row units into the basket 30, the finger grates 42 are positioned (42') to direct substantially all the harvested material away from the basket inlet and downwardly into the accumulator chamber 44. Activation of the grates 42 may be accomplished in a conventional manner utilizing hydraulic or electric actuators and either an operator switch in the cab 18 or automatic switch or sensor structure responsive to the basket entering the unloading mode. The metering floor rollers 68 are stopped to close the bottom of the chamber 44 to egress of material while the basket 30 is in the unloading mode. The capacity of the chamber 44 is sufficient to hold all the material harvested while flow to the basket 30 is interrupted.

Once the basket 30 is again ready to receive harvested material, the metering floor rollers 68 are rotated by conventional variable speed drive structure on the harvester 10 and the air nozzle structure 60 is activated to meter material into the duct 54 for delivery to the basket 30. The chamber 44 may be gradually unloaded during normal harvesting operations at a rate such that the full capacity of the accumulator system 34 is available the next time flow to the basket has to be interrupted so continuous harvesting is assured. Alternatively, most or all of the flow of material to the basket 30 may be provided through the accumulator system 34 via metering floor and duct 54 by directing material from the duct outlet 26 into the inlet 34. The unloading rate can be varied by changing the speed of rotation of the rollers 68 to match harvest conditions and cotton handling capacities of the harvest system.

Having described the preferred embodiment, it will become apparent that various modifications can be made without departing from the scope of the invention as defined in the accompanying claims.

What is claimed is:

1. A harvester having a frame and including crop removing structure supported by the frame for removing crop from plants, a receptacle supported on the frame and having a loading condition for receiving the crop and an unloading condition for unloading the crop, an air duct system including a first duct extending upwardly from the crop removing structure and receiving the removed crop, a crop accumulator supported by the frame adjacent the receptacle and having an accumulator inlet and an accumulator outlet, a source of propelling air on the harvester for moving the removed crop upwardly through the first duct towards the accumulator inlet, the air duct system including a second duct located adjacent the accumulator outlet and connected to the source of propelling air, the accumulator receiving the crop while the receptacle is in the unloading condition so that the harvester can continue to remove crop while the receptacle is unloaded, wherein the air duct system moves crop from the accumulator to the receptacle when the receptacle is in the loading condition, and including metering structure located adjacent the accumulator outlet for metering cotton from the accumulator to the air duct system when the receptacle is in the loading condition.

2. The harvester as set forth in claim 1 including diverter structure located adjacent the accumulator inlet, the diverter structure facilitating movement of the removed crop from the first duct directly into the receptacle when the receptacle is in the loading condition and directing the removed crop downwardly into the accumulator when the receptacle is in the unloading condition.

3. A harvester having a frame and including crop removing structure supported by the frame for removing crop from plants, a receptacle supported on the frame and having a loading condition for receiving the crop and an unloading condition for unloading the crop, an air duct system including a first duct extending upwardly from the crop removing structure and receiving the removed crop, a crop accumulator supported by the frame adjacent the receptacle and having an accumulator inlet and an accumulator outlet, a source of propelling air on the harvester for moving the removed crop upwardly through the first duct towards the accumulator inlet, the air duct system including a second duct located adjacent the accumulator outlet and connected to the source of propelling air, the accumulator receiving the crop while the receptacle is in the unloading condition so that the harvester can continue to remove crop while the receptacle is unloaded, wherein the air duct system moves crop from the accumulator to the receptacle when the receptacle is in the loading condition, and wherein the receptacle has an inlet area for receiving material directed along a path from the first and second ducts, wherein the inlet area moves relative to the path when the receptacle is placed in the unloading condition, and structure preventing flow of material from the air duct system along the path when the receptacle is placed in the unloading condition.

4. The harvester as set forth in claim 3 wherein the structure preventing flow of material includes a diverter directing cotton into the accumulator inlet and accumulator floor structure closing the accumulator outlet to egress of the crop when the receptacle is in the unloading condition.

5. A method of moving harvested cotton relative to a cotton harvester basket having a loading position and an unloading position, the method comprising:

supporting an accumulator on the cotton harvester adjacent the basket;

directing the harvested cotton into the cotton harvester basket when the basket is in the loading position;

limiting flow of harvested cotton towards the basket when the basket in moved towards the unloading position by directing cotton into the accumulator;

directing the cotton in the accumulator from the outlet and into the basket when the basket is in the loading position; and wherein the step of directing the harvested cotton into the cotton harvester basket when the basket is in the loading position includes moving the cotton over the accumulator directly into the basket.

6. The method as set forth in claim 5 including the step of continuing to harvest cotton from cotton plants when the basket is in the unloading position.

7. The method as set forth in claim 5 wherein the step of limiting flow of harvested cotton towards the basket when the basket is moved towards the unloading position includes intercepting the flow of harvested cotton and diverting cotton downwardly into the accumulator.

8. The method as set forth in claim 7 wherein the step of intercepting includes moving grate structure from a first position which allows cotton to flow directly into the basket to a second position into the flow of cotton.

9. The method as set forth in claim 5 wherein the step of supporting an accumulator includes providing an accumulator inlet directly below the outlet end of an air conveying duct opening towards the basket.

10. A method of moving harvested cotton relative to a cotton harvester basket having a loading position and an unloading position, the method comprising:

supporting an accumulator on the cotton harvester adjacent the basket;

directing the harvested cotton into the cotton harvester basket when the basket is in the loading position;

limiting flow of harvested cotton towards the basket when the basket in moved towards the unloading position by directing cotton into the accumulator;

directing the cotton in the accumulator from the outlet and into the basket when the basket is in the loading position; and further comprising the steps of supporting an accumulator conveying duct adjacent the outlet and selectively directing harvested cotton from the outlet towards the basket.

11. A method of moving harvested cotton relative to a cotton harvester basket having a loading position and an unloading position, the method comprising:

supporting an accumulator on the cotton harvester adjacent the basket;

directing the harvested cotton into the cotton harvester basket when the basket is in the loading position;

limiting flow of harvested cotton towards the basket when the basket in moved towards the unloading position by directing cotton into the accumulator;

directing the cotton in the accumulator from the outlet and into the basket when the basket is in the loading position; and wherein the step of directing the cotton in the accumulator from the outlet and into the basket includes selectively metering the cotton into an air stream of an air duct extending from the accumulator towards the basket.

12. The method as set forth in claim 11 wherein the step of directing the harvested cotton into the cotton harvester basket includes blowing cotton from a first harvester duct over the accumulator, and the step directing the cotton in the accumulator from the outlet and into the basket includes blowing cotton from a second harvester duct extending between the outlet towards the basket.

13. The method as set forth in claim 12 including metering the cotton from the accumulator while the harvester is harvesting cotton.

14. The method as set forth in claim 5 wherein the step of directing the cotton in the accumulator from the outlet and into the basket when the basket is in the loading position includes directing the cotton from the accumulator into the basket while the harvester harvests cotton from cotton plants.

15. A harvester having a receptacle movable between a harvest position for receiving crop and a dump position for unloading the crop, an accumulator with an inlet, a duct system with a first duct extending upwardly towards the inlet for directing crop to the inlet, a second duct opening into the accumulator and directing crop from the accumulator to the receptacle, the first duct directing substantially all the crop into the accumulator when the receptacle is moved into the dump position so that the harvester can continue to operate while the receptacle is unloaded, and metering structure located between the second duct and the accumulator for metering crop from the accumulator to the receptacle when in the harvest position, and including gate structure located between the accumulator and the second duct, the gate structure preventing movement of crop from the accumulator to the receptacle when the receptacle is in the dump position.

16. A harvester having a receptacle movable between a harvest position for receiving crop and a dump position for unloading the crop, an accumulator with an inlet, a duct system with a first duct extending upwardly towards the inlet for directing crop to the inlet, a second duct opening into the accumulator and directing crop from the accumulator to the receptacle, the first duct directing substantially all the crop into the accumulator when the receptacle is moved into the dump position so that the harvester can continue to operate while the receptacle is unloaded, and metering structure located between the second duct and the accumulator for metering crop from the accumulator to the receptacle when in the harvest position, and including diverter structure located adjacent the inlet, the diverter structure facilitating movement of the removed crop from the first duct directly into the receptacle when the receptacle is in the harvest position and directing substantially all the removed crop downwardly into the accumulator when the receptacle is moved towards the dump position.

17. A harvester having a receptacle movable between a harvest position for receiving crop and a dump position for unloading the crop, an accumulator with an inlet, a duct system with a first duct extending upwardly towards the inlet for directing crop to the inlet, a second duct opening into the accumulator and directing crop from the accumulator to the receptacle, the first duct directing substantially all the crop into the accumulator when the receptacle is moved into the dump position so that the harvester can continue to operate while the receptacle is unloaded, and metering structure located between the second duct and the accumulator for metering crop from the accumulator to the receptacle when in the harvest position, and wherein the receptacle comprises a cotton basket, the first duct includes a rearwardly directed outlet opening towards a basket inlet located above the accumulator inlet, and the first and second ducts comprise upright air conveying ducts connected to a source of air on the harvester.

* * * * *